United States Patent
Ahn

(10) Patent No.: US 6,466,575 B1
(45) Date of Patent: Oct. 15, 2002

(54) METHOD FOR INTERFACING RATE ADAPTATION PROCESSING UNIT AND BOARD MESSENGER PROCESSING UNIT IN A WIRELESS DATA COMMUNICATION PROCESSING APPARATUS

(75) Inventor: Sang-sun Ahn, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/390,118

(22) Filed: Sep. 3, 1999

(30) Foreign Application Priority Data

Sep. 4, 1998 (KR) .............................. 98-36455

(51) Int. Cl.[7] .................. H04L 12/28; H04L 12/56
(52) U.S. Cl. .................. 370/389; 370/428; 370/465
(58) Field of Search ................. 370/389, 465, 370/428

(56) References Cited

U.S. PATENT DOCUMENTS

| | | | | |
|---|---|---|---|---|
| 4,777,595 A | * | 10/1988 | Strecker | 364/200 |
| 4,947,388 A | * | 8/1990 | Kuwahara | 370/60 |
| 5,175,818 A | * | 12/1992 | Kunimoto | 395/200 |
| 5,303,236 A | * | 4/1994 | Kunimoto | 370/60.1 |
| 6,075,798 A | * | 6/2000 | Lyons | 370/474 |
| 6,091,736 A | * | 7/2000 | Hayashi | 370/428 |
| 6,256,306 B1 | * | 7/2001 | Bellenger | 370/389 |
| 6,275,494 B1 | * | 8/2001 | Endo | 370/395 |
| 6,353,616 B1 | * | 3/2002 | Elwalid | 370/443 |

* cited by examiner

Primary Examiner—Ajit Patel
Assistant Examiner—Chirag Shah
(74) Attorney, Agent, or Firm—Klauber & Jackson; Steve Cha

(57) ABSTRACT

A method for interfacing between a rate adaptation processing unit (RAPU) and a board messenger processing unit (BMPU) in a wireless data communication processing apparatus is disclosed, wherein the method includes the following steps: forming common header in a first address of an allocated data buffer, the common header being usable commonly by a rate adaptation (RA) protocol data (RAPD) and a board messenger (BM) protocol data (BMPD) when the respective protocol data (PD) is received through the interfacing of the RAPU or the BMPU; storing the received PD in an information field; processing the common header by either the RAPU or the BMPU, depending on the flow direction of the protocol data between a communication system and the other communication system; and thereafter, placing a message pointer at the first address of the data buffer for receiving next set of protocol data.

3 Claims, 6 Drawing Sheets

METHOD FOR INTERFACING RATE ADAPTATION PROCESSING UNIT AND BOARD MESSENGER PROCESSING UNIT IN A WIRELESS DATA COMMUNICATION PROCESSING APPARATUS

CLAIM OF PRIORITY

This application makes reference to, incorporates the same herein, and claims all benefits accruing under 35 U.S.C. §119 arising from an application entitled, METHOD OFR INTERFACING RATE ADAPTATION PROCESSING UNIT AND BOARD MESSENGER PROCESSING UNIT IN A WIRELESS DATA COMMUNICATION PROCESSING APPARATUS, earlier filed in the Korean Industrial Property Office on Sep. 4, 1998, and there duly assigned Serial No. 1998-36455.

FIELD OF THE INVENTION

The present invention relates to a method for interfacing a rate adaptation-processing unit (RAPU) and a board messenger-processing unit (BMPU) in a wireless data communication apparatus, and more particularly, it relates to a method for reducing the load on the CPU to be processed and for minimizing inefficient memory usage by the communication protocols.

DESCRIPTION OF THE RELATED ART

FIG. 1 depicts a method used in the prior art for interfacing a rate adaptation processing unit (RAPU) (10) and a board messenger processing unit (BMPU) (20). The respective RAPU (10) and BMPU (20) represents two different packet data units (PDUs) of two different systems, such as found in IWF system having a wireless subscriber unit and a wired subscriber unit. When the data is transferred between these two different systems, the process of data transfer is made in accordance with FIG. 1.

As shown in FIG. 1, a rate adaptation receiving unit (RARU) (11) of a RAPU (10) processes the data received via a rate adaptation (RA) interface (RAI) using the RA protocol (RAP) disposed therein. In order to transmit the processed data according to the RA protocol to the board messenger transmitting unit (BMTU) (21) of the BMPU (20), the whole processed data, including the common header and the data information, is duplicated in another buffer and transmitted to the board messenger transmitting unit (BMTU) (21) of the BMPU (20).

Similarly, when the data is processed by BM protocol and transmitted to a rate adaptation transmitting unit (RATU) (12) of the RAPU (10), the whole processed data is duplicated in another buffer and transmitted when the data transfer is made from the board messenger receiving unit (BMRU) (22) of the BMPU (20).

In prior art, after the transformation by the respective protocol in two different systems, the whole data are duplicated in another buffer during the data interfacing of the RAPU (10) and the BMPU (20) therebetween. As a result, the load on CPU is increased due to repetitive duplication of the whole transferring data in another buffer when the data is exchanged between two different processing units of two different systems. Thus, the memory is used inefficiently due to such repetitive duplication of the data into another buffer.

SUMMARY OF THE INVENTION

One of the objects in according to the present invention is to provide a method for interfacing a rate adaptation-processing unit (RAPU) and a board messenger-processing unit (BMPU) therebetween in a wireless data communication processing units.

Another object of the present invention is to reduce the size of data duplication required when RAPU interfaces BMPU or when BMPU interfaces RAPU, by forming a common header offset, which can be used commonly by either a rate adaptation protocol and a board messenger protocol when the interfacing is performed between the RAPU and the BMPU.

A first preferred embodiment of a method for interfacing a rate adaptation processing unit (RAPU) and a board messenger processing unit (BMPU) in a wireless data communication processing apparatus, the method includes the steps of:

in response to a group of protocol data (PD) transferred from one communication system to another communication system, forming a common header field having a rate adaptation (RA) header and a board message (BM) header and a data field in a predetermined area of a data buffer, wherein the common header field is commonly shared by a rate adaptation (RA) protocol and a board message (BM) protocol;

setting a protocol offset for the RA header and the BM header in a predetermined area of the common header field to designate the start of the RA header and the BM header, and setting the first address of each the RA header and the BM header by a message pointer, respectively, to indicate the beginning point for receiving the group of the protocol data in the data buffer;

processing the common header field by either the rate adaptation processing unit or the board message processing unit for transmission, depending on flow direction of the group of the protocol data between the one communication system and the another communication system; and, transmitting the processed common header field and the data field via a queue interface disposed between the rate adaptation processing (RAPU) and the board messenger processing unit (BMPU), and thereafter locating the message pointer at the first address of the common header for receiving next set of the protocol data in the data buffer.

A second preferred embodiment of a method for interfacing a rate adaptation processing unit (RAPU) and a board messenger processing unit (BMPU) in a wireless data communication processing apparatus according to the present invention, the method includes the steps of:

receiving a group of protocol data (PD) in a rate adaptation-receiving unit (RARU) of the rate adaptation processing unit (RAPU) via a rate adaptation interface (RAI);

allocating a data buffer according to the received protocol data;

forming a common header field having a rate adaptation (RA) header and a board message (BM) header and a data field in a predetermined area of the data buffer, wherein the common header field is commonly shared by a rate adaptation (RA) protocol and a board message (BM) protocol;

setting a protocol offset for the RA header and the BM header in a predetermined area of the common header field to designate the start of the RA header and the BM header, and setting the first address of each the RA header and the BM header by a message pointer, respectively, to indicate the beginning point for receiving the group of the protocol data in the data buffer;

processing only the RA header starting from the first address of the RA header indicated by the RA pointer by the rate adaptation processing unit (RAPU) for transmission;

transmitting the processed RA header of the common header field and the data field via a queue interface disposed between the rate adaptation processing (RAPU) and the board messenger processing unit (BMPU);

processing only the BM header starting from the first address of the BM header indicated by the BM pointer by the board messenger processing unit (BMPU) for transmission;

transmitting the processed BM header of the common header field and the data field via a board messenger interface; and, locating the BM pointer at the first address of the common header for receiving a next set of protocol data from the rate adaptation processing unit (RAPU) via the queue interface.

A third preferred embodiment of a method for interfacing a rate adaptation processing unit (RAPU) and a board messenger processing unit (BMPU) in a wireless data communication processing apparatus according to the present invention, the method includes the steps of:

receiving a group of protocol data (PD) in a board messenger receiving unit (BMRU) of the board messenger processing unit (BMPU) via a board messenger interface (BMI);

allocating a data buffer according to the received protocol data;

forming a common header field having a rate adaptation (RA) header and a board message (BM) header and a data field in a predetermined area of the data buffer, wherein the common header field is commonly shared by a rate adaptation (RA) protocol and a board message (BM) protocol;

setting a protocol offset for the RA header and the BM header in a predetermined area of the common header field to designate the start of the RA header and the BM header, and setting the first address of each the RA header and the BM header by a message pointer, respectively, to indicate the beginning point for receiving the group of the protocol data in the data buffer;

processing only the BM header starting from the first address of the BM header indicated by the BM pointer by the board messenger processing unit (BMPU) for transmission;

transmitting the processed BM header of the common header field and the data field via a queue interface disposed between the rate adaptation processing (RAPU) and the board messenger processing unit (BMPU);

processing only the RA header starting from the first address of RA header indicated by the RA pointer by the rate adaptation processing unit (RAPU);

transmitting the RA header of the common header field and the data field via a rate adaptation interface; and, locating the RA pointer at the first address of the common header for receiving a next set of protocol data from the board messenger processing unit.

DETAILED DESCRIPTION OF THE PREFERRED EMBODIMENTS

Figure 1:
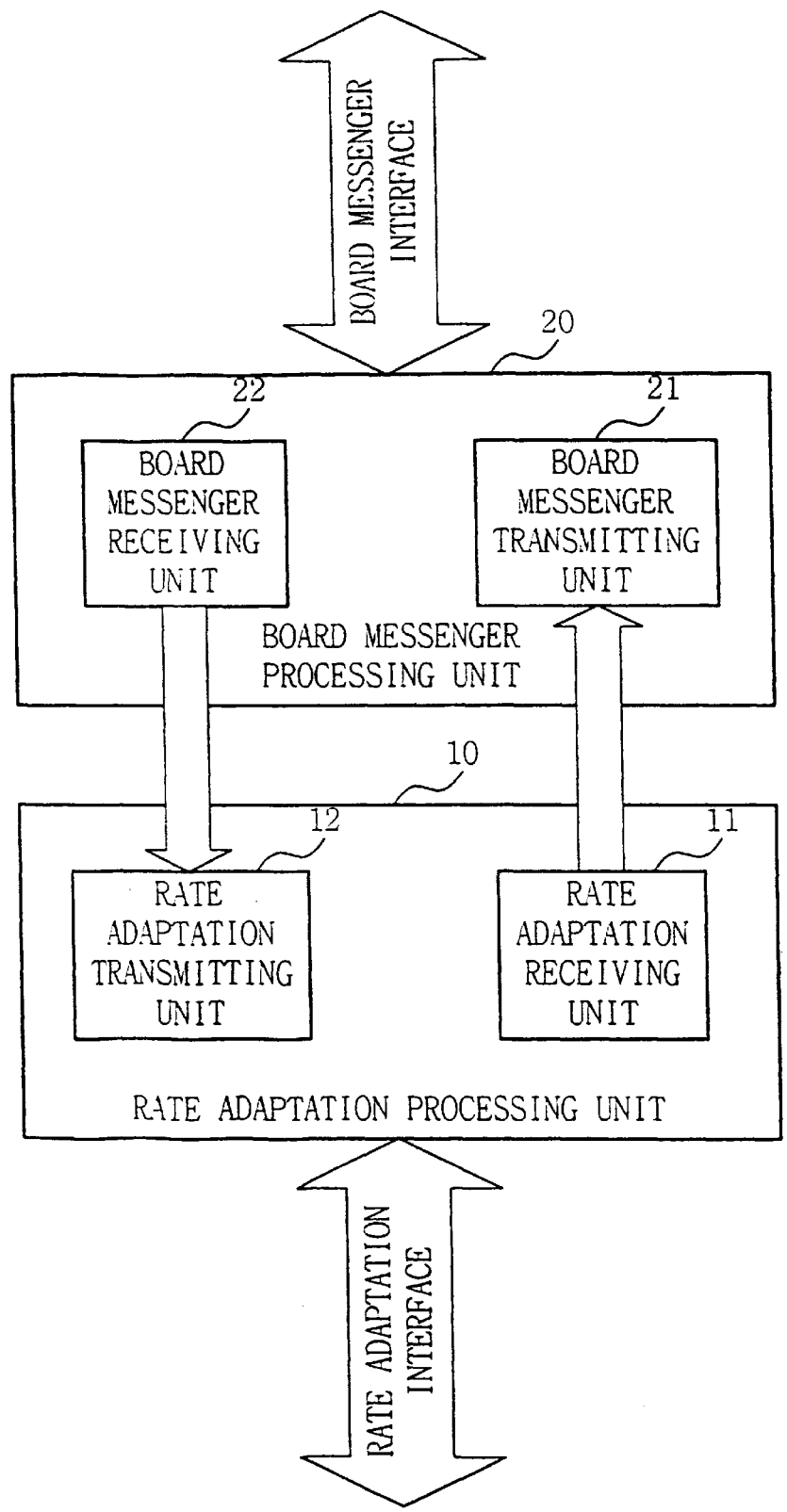
FIG. 1 illustrates a block diagram for interfacing a rate adaptation-processing unit and a board messenger-processing unit in a conventional wireless data communication processing apparatus.
Figure 2A:
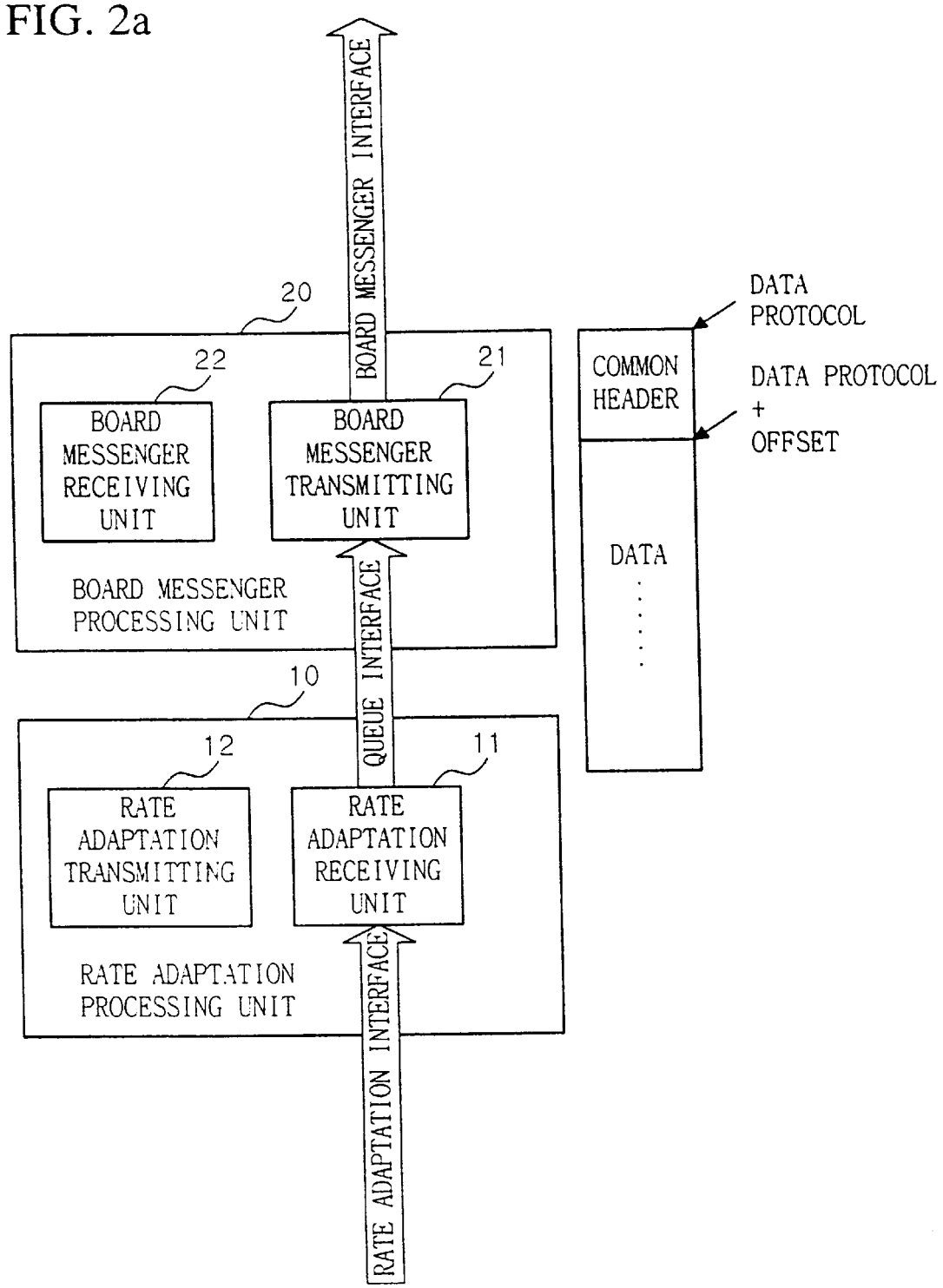
FIG. 2 illustrates a preferred embodiment of the present invention for interfacing a rate adaptation-processing unit (RAPU) and a board messenger-processing unit (BMPU) in a wireless data communication processing apparatus.
Figure 2B:
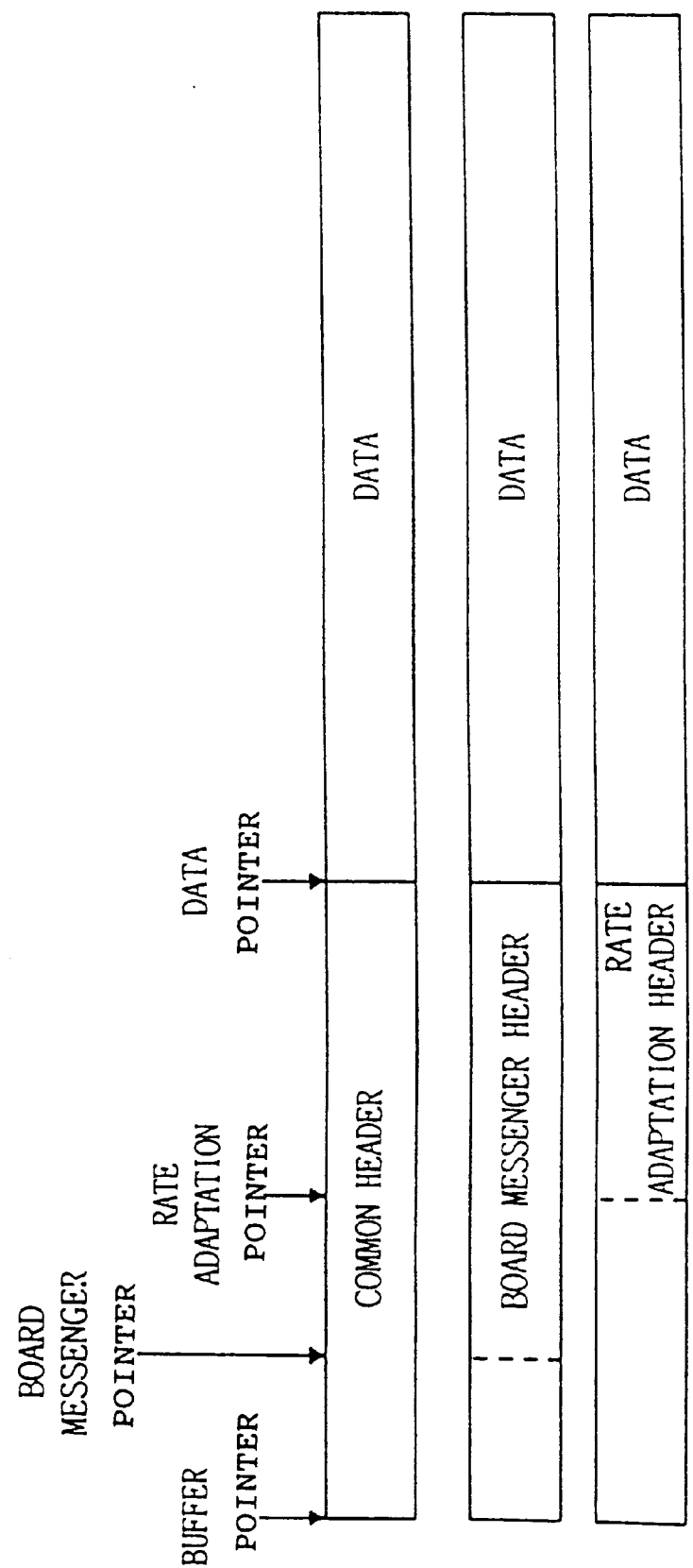
Figure 3A:
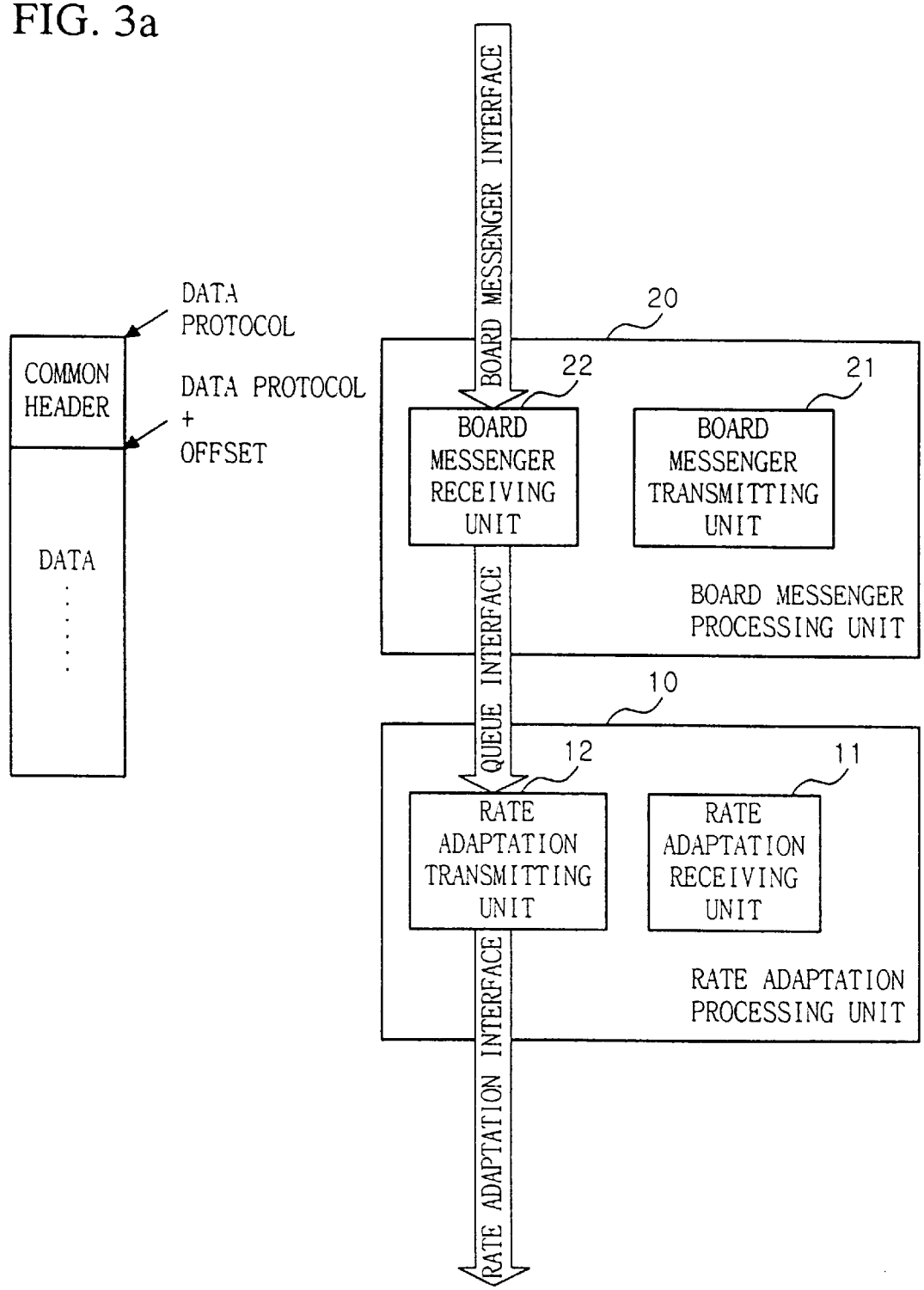
FIG. 3 illustrates another preferred embodiment for interfacing a RAPU and a BMPU in a wireless data communication processing apparatus according to the present invention.
Figure 3B:
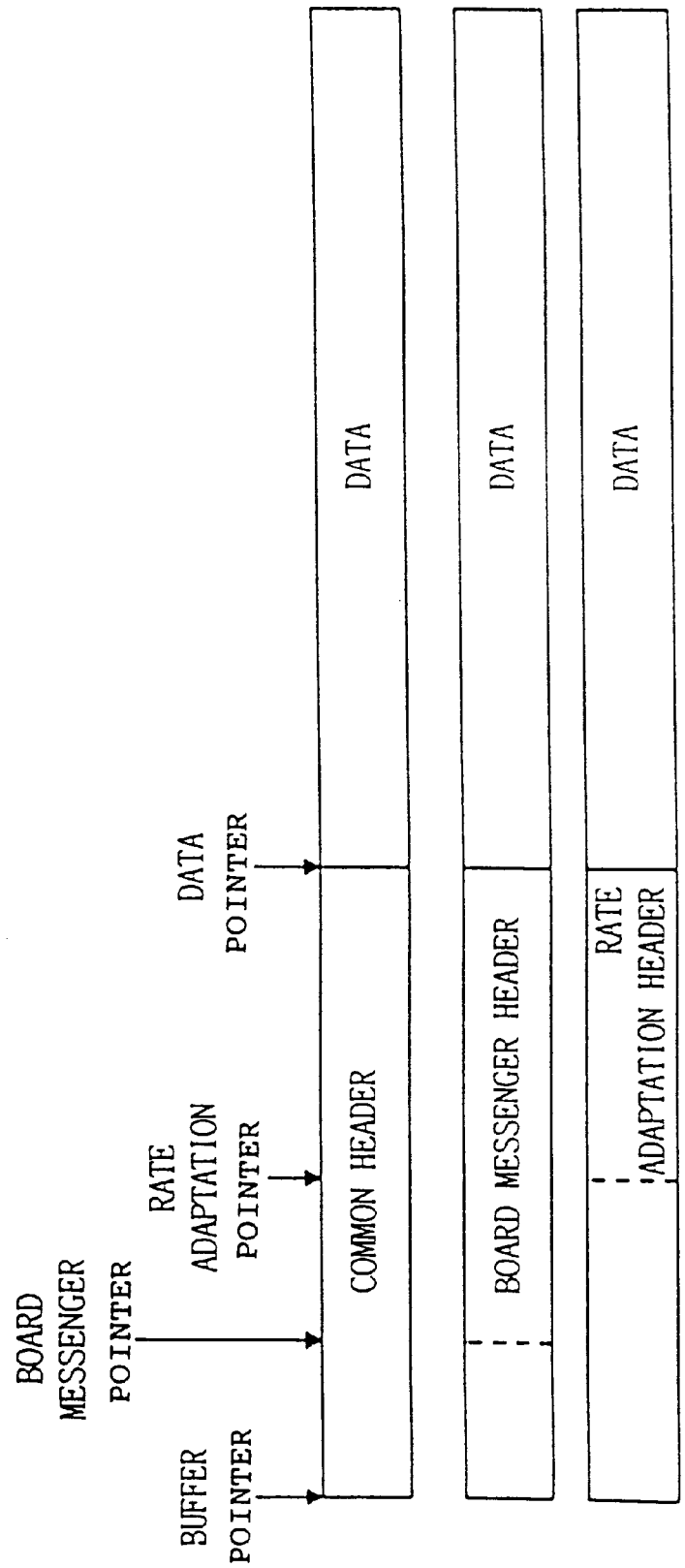
Figure 4:
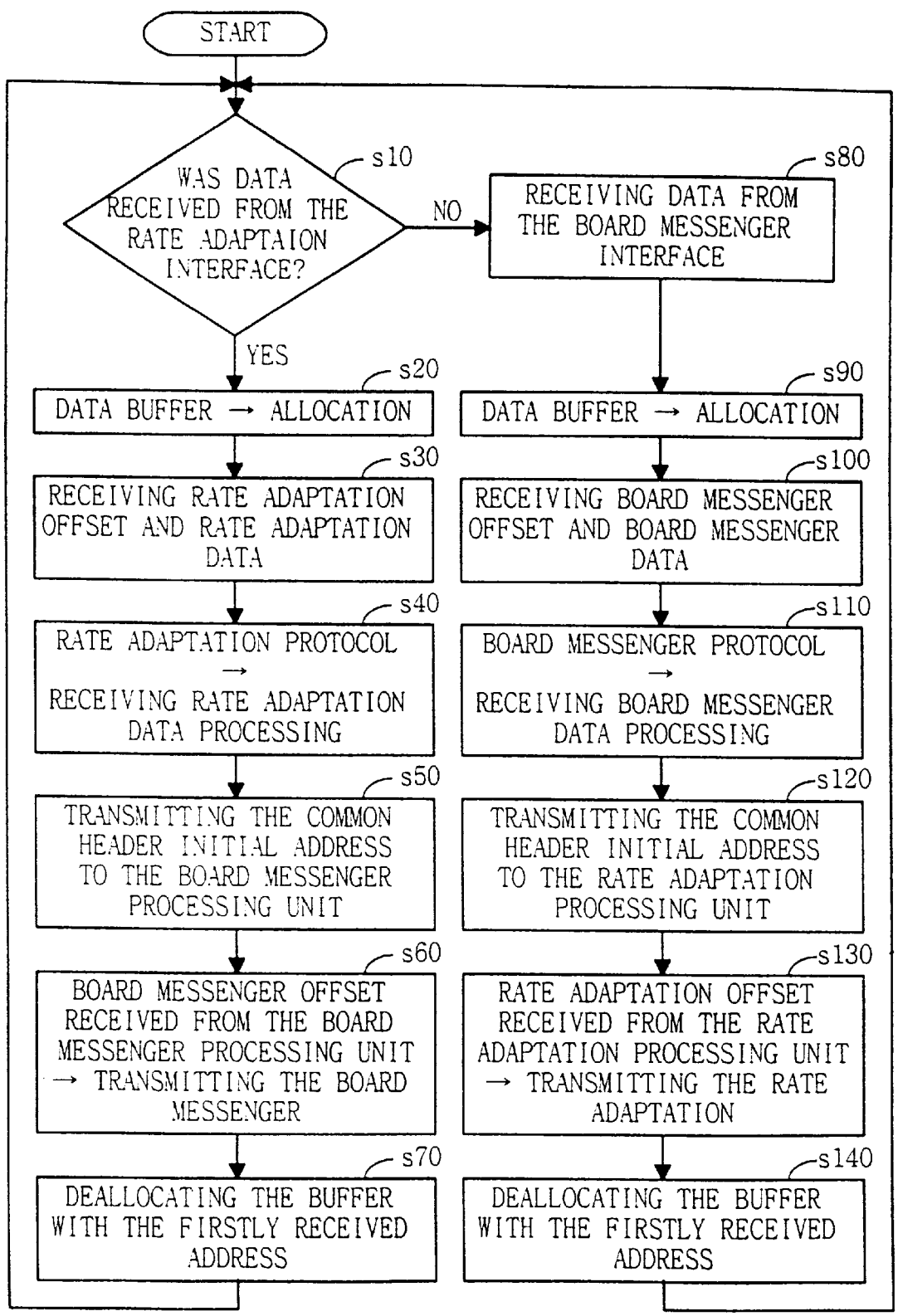
FIG. 4 illustrates a flow chart of FIGS. 2 and 3.

As illustrated in FIGS. 2, 3 and 4, a first preferred embodiment of a method for interfacing a rate adaptation processing unit (RAPU) (10) and a board messenger processing unit (BMPU) (20) in a wireless data communication processing apparatus according to the present invention includes the following steps:

At step s20 and s90, in response to a protocol data (PD) being transferred from one communication system to another communication system, a common header field and a data field are formed in a predetermined area of a data buffer, wherein the common header field includes a rate adaptation (RA) header and a board message (BM) header as shown in FIG. 2b and FIG. 3b, and wherein the common header field is usable commonly by a rate adaptation (RA) protocol data (RAPD) and a board messenger protocol data (BMPD);

At step s30 and s100, a protocol offset for the RA header and BM header are stored in a predetermined area of the common header field to indicate the starting point of the respective headers, and the received protocol data are stored in the common header field and the data field, respectively.

At step s40 and s100, the common header field is processed by either the rate adaptation processing unit or the board message processing unit for transmission, depending on the flow direction of the protocol data between the communication system and the another communication system.

At step s50 and s120, the processed common header field and the stored protocol data are transmitted through a queue interface disposed between the rate adaptation processing (RAPU) and the board messenger processing unit (BMPU), and thereafter a message pointer is placed at the first address of the either the common header for receiving next set of protocol data.

As illustrated in FIGS. 2 and 4, a second preferred embodiment of a method for interfacing a rate adaptation processing unit (RAPU) and a board messenger processing unit (BMPU) in a wireless data communication processing apparatus according to the present invention includes the following steps:

At step s10, a protocol data (PD) is received in a rate adaptation-receiving unit (RARU) of the rate adaptation processing unit (RAPU) through a rate adaptation interface (RAI).

At step 20, a data buffer is allocated according to the received protocol data. A common header field and a data field are formed in a predetermined area of a data buffer, the common header field being usable commonly by a rate adaptation (RA) protocol data (RAPD) and a board messenger protocol data (BMPD), wherein the common header field includes a rate adaptation (RA) header and a board message (BM) header.

At step s30, the rate adaptation offset and the received protocol data are stored in the common header field and the data field, respectively, and the first address of the RA header is indicated by a RA pointer.

At step s40, only the RA header of the common header field is processed by the rate adaptation processing unit (RAPU) for transmission.

At step s50, the processed RA header of the common header field and the stored protocol data in the data field are transmitted through a queue interface disposed between the rate adaptation processing (RAPU) and the board messenger processing unit (BMPU).

At step s60, only the BM header is processed by the board messenger processing unit (BMPU), and then, the processed BM header and the stored protocol data are in the data field are transmitted via a board messenger interface.

At step s70, a BM pointer is placed at the first address of the common header for receiving next set of protocol data.

And as illustrated in FIGS. 3 and 4, a third preferred embodiment of a method for interfacing a rate adaptation processing unit (RAPU) and a board messenger processing unit (BMPU) in a wireless data communication processing apparatus according to the present invention includes the following steps:

At step s80, a protocol data (PD) is received in a board messenger receiving unit (BMRU) of the board messenger processing unit (BMPU) through a board messenger interface (BMI).

At step s90, a data buffer is allocated according to the received protocol data, and a common header field and a data field are formed in a predetermined area of a data buffer, the common header field being usable commonly by a rate adaptation (RA) protocol data (RAPD) and a board messenger protocol data (BMPD), wherein the common header field comprising a rate adaptation (RA) header and a board message (BM) header.

At step s100, the board message offset and the received protocol data are stored in the common header field and the received protocol data, respectively.

At step s110, only the common header field is processed by the board messenger processing unit (BMPU) for transmission.

At step s120, the processed common header field and the stored protocol data in the information field are transmitted through a queue interface disposed between the rate adaptation processing (RAPU) and the board messenger processing unit (BMPU).

At step s130, only the common header field is processed by the rate adaptation processing unit (RAPU), the processed common header field and the stored protocol data in the information field are transmitted via a rate adaptation interface.

At step s140, a message pointer is placed at the first address of the common header for receiving next set of protocol data.

In reference to FIG. 2a, the interfacing of RAPU (10) and BMPU (20) is illustrated in accordance with the present invention. Upon receiving data from RAI at the RARU (11), the RA protocol disposed in the RARU (110) process the received data, and a common header field and a data field are formed in a predetermined area of a data buffer, which is to be used commonly by the RAPD (10) and BMPD (20) during the data transfer, as shown in FIG. 2b. That is, when the common header field and the data field are transmitted between RAPU (10) to BMPU (20), the data information field remains unchanged and only the common header field is processed by either RAPU (10) or BMPU (20) during the data transfer.

Unlike the prior art where the duplication of the common header field and the data information field are made in another buffer during the data transfer, causing unnecessary usage in the buffer space, the present invention focuses on the common header field, which is commonly used by both RAPU (10) and BMPU (20), without the undesirable need to duplicate the common header field and the data information field.

According to FIGS. 2b and 3b, the common header offset is composed of a buffer pointer, a board messenger header pointer, a rate adaptation pointer, and a data pointer, for indicating the first address for each respective headers. That is, the common header is configured to provide a BM header offset and a RA header offset to indicate the end of the pointer field and the start of next group of information According to the FIG. 4, the present invention initially checks for whether the RA data was received from a RA interface (s10). If the data was received from the RAI, a buffer of the RA receiving unit is allocated (s20) for receiving the RA offset in the common header and RA data in the data information field, as shown in FIG. 2b (s30). And at the RAPU (10), the received RA data from the RAI is processed by a RA protocol (s40). And through the interfacing, the common header initial address indicating the position of the respective header offsets and the data information field is transmitted to the BMTU (21) of the BMPU (20) (s50).

At the BMTU (21) of the BMPU (20), only the common header is processed with a BM protocol, and then transmitted via a BM interface (s60). Thereafter, the buffer with the BM header offset and the data information is deallocated/emptied for receiving a next set of data, and the pointer is located to the first address of the data buffer for indicating where the next set of group of information is to be allocated (s70).

Similarly, if data is received from the BMI (s80), a buffer is allocated in the BMRU(22) of the BMPU (20) (s90) for receiving the BM offset in the common header and the BM data in the data information field (s90), as shown in FIG. 3b. The received BM data from the BMI is processed through the BM protocol (s110) and transmitted to the RATU (12) of the RAPU (10) (s120). At the RAPU (10), the transmitted common header from the BMPR (20) is processed with the RA protocol (s130), and then transmitted via the RA interface from the RAPU (10) (s140). Thereafter, the buffer having the BM header and the data information is de-allocated/emptied for receiving a next set of data, and the pointer is located to the first address of the common header for indicating a starting point where the next set of group of information is to be allocated (s140).

As explained in the above, in the event that there is interfacing between a rate adaptation processing unit (RAPU) and a board messenger processing unit (BMPU) of two different wireless communication systems, the present invention helps to eliminates the duplication of data during the data transfer, which reduces the memory used for such duplication as well as the load to CPU.

What is claimed is:

1. A method for interfacing between a rate adaptation processing unit (RAPU) and a board messenger processing unit (BMPU) in a wireless data communication processing devices, said method comprising the steps of:

in response to a group of protocol data (PD) transferred from one communication system to another communication system, forming a common header field having a rate adaptation (RA) header and a board message (BM) header and a data field in a predetermined area of a data buffer, wherein said common header field is commonly shared by a rate adaptation (RA) protocol and a board message (BM) protocol;

setting a protocol offset for said RA header and said BM header in a predetermined area of said common header field to designate the start of said RA header and said BM header, and setting the first address of each said RA header and said BM header by a message pointer, respectively, to indicate the beginning point for receiving said group of said protocol data in said data buffer;

processing said common header field by either said rate adaptation processing unit or said board message processing unit for transmission, depending on flow direction of said group of said protocol data between said one communication system and said another communication system; and, transmitting said processed common header field and said data field via a queue interface disposed between said rate adaptation processing (RAPU) and said board messenger processing unit (BMPU), and thereafter locating said message pointer at the first address of said common header for receiving next set of said protocol data in said data buffer.

2. A method for interfacing between a rate adaptation processing unit (RAPU) and a board messenger processing unit (BMPU) in a wireless data communication processing devices, said method comprising the steps of:

receiving a group of protocol data (PD) in a rate adaptation-receiving unit (RARU) of said rate adaptation processing unit (RAPU) via a rate adaptation interface (RAI);

allocating a data buffer according to said received protocol data;

forming a common header field having a rate adaptation (RA) header and a board message (BM) header and a data field in a predetermined area of said data buffer, wherein said common header field is commonly shared by a rate adaptation (RA) protocol and a board message (BM) protocol;

setting a protocol offset for said RA header and said BM header in a predetermined area of said common header field to designate the start of said RA header and said BM header, and setting the first address of each said RA header and said BM header by a message pointer, respectively, to indicate the beginning point for receiving said group of said protocol data in said data buffer;

processing only said RA header starting from the first address of said RA header indicated by said RA pointer by said rate adaptation processing unit (RAPU) for transmission;

transmitting said processed RA header of said common header field and said data field via a queue interface disposed between said rate adaptation processing (RAPU) and said board messenger processing unit (BMPU);

processing only said BM header starting from the first address of said BM header indicated by said BM pointer by said board messenger processing unit (BMPU) for transmission;

transmitting said processed BM header of said common header field and said data field via a board messenger interface; and, locating said BM pointer at the first address of said common header for receiving a next set of protocol data from said rate adaptation processing unit (RAPU) via said queue interface.

3. A method for interfacing between a rate adaptation processing unit (RAPU) and a board messenger processing unit (BMPU) in a wireless data communication processing devices, said method comprising the steps of:

receiving a group of protocol data (PD) in a board messenger receiving unit (BMRU) of said board messenger processing unit (BMPU) via a board messenger interface (BMI);

allocating a data buffer according to said received protocol data;

forming a common header field having a rate adaptation (RA) header and a board message (BM) header and a data field in a predetermined area of said data buffer, wherein said common header field is commonly shared by a rate adaptation (RA) protocol and a board message (BM) protocol;

setting a protocol offset for said RA header and said BM header in a predetermined area of said common header field to designate the start of said RA header and said BM header, and setting the first address of each said RA header and said BM header by a message pointer, respectively, to indicate the beginning point for receiving said group of said protocol data in said data buffer;

processing only said BM header starting from the first address of said BM header indicated by said BM pointer by said board messenger processing unit (BMPU) for transmission;

transmitting said processed BM header of said common header field and said data field via a queue interface disposed between said rate adaptation processing (RAPU) and said board messenger processing unit (BMPU);

processing only said RA header starting from the first address of RA header indicated by said RA pointer by said rate adaptation processing unit (RAPU);

transmitting said RA header of said common header field and said data field via a rate adaptation interface; and, locating said RA pointer at the first address of said common header for receiving a next set of protocol data from said board messenger processing unit.

* * * * *